United States Patent [19] [11] Patent Number: 5,069,517
Kersten et al. [45] Date of Patent: Dec. 3, 1991

[54] INTEGRATED OPTICAL WAVEGUIDE

[75] Inventors: Peter Kersten, Leonberg; Helmut Hanisch, Nürtingen, both of Fed. Rep. of Germany

[73] Assignee: Alcatel N.V., Amsterdam, Netherlands

[21] Appl. No.: 578,092

[22] Filed: Sep. 5, 1990

[30] Foreign Application Priority Data

Sep. 5, 1989 [DE] Fed. Rep. of Germany ....... 3929410

[51] Int. Cl.$^5$ .............................................. G02B 6/10
[52] U.S. Cl. ...................................... 385/130; 385/3; 385/41; 385/16
[58] Field of Search ......................... 350/96.11-96.15, 350/96.17, 96.20, 320; 156/637, 643

[56] References Cited

U.S. PATENT DOCUMENTS

| 4,445,751 | 5/1984 | Divens et al. | 350/96.17 X |
| 4,474,429 | 10/1984 | Yoldas et al. | 350/96.17 X |
| 4,768,848 | 9/1988 | Vaerewyck | 350/96.12 |
| 4,871,223 | 10/1989 | Auracher et al. | 350/96.13 X |
| 4,936,645 | 6/1990 | Yoon et al. | 350/96.12 X |

FOREIGN PATENT DOCUMENTS 0304602 7/1988 European Pat. Off. .

Primary Examiner—Akm Ullah
Attorney, Agent, or Firm—Spencer & Frank

[57] ABSTRACT

A transparent substrate is covered with a metal layer which serves as an etch mask for forming a groove, and from which regions are formed which constitute electrodes. At least the groove and the adjacent areas of the substrate are then covered with a layer of a material having electrooptical properties, the material in the groove forming an optical waveguide.

8 Claims, 2 Drawing Sheets

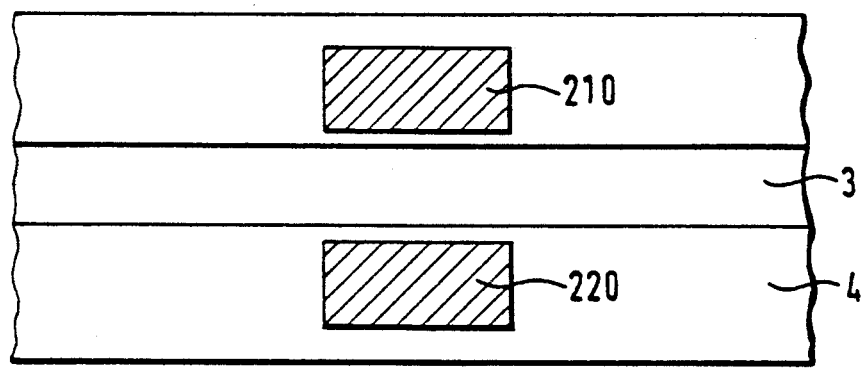
Fig. 5
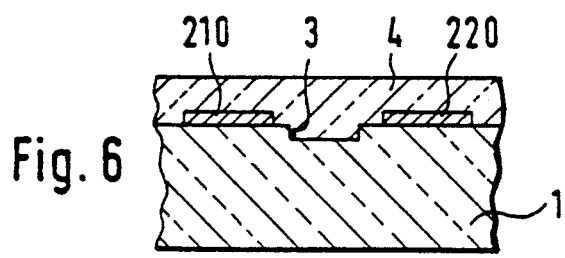
Fig. 6
Fig. 7
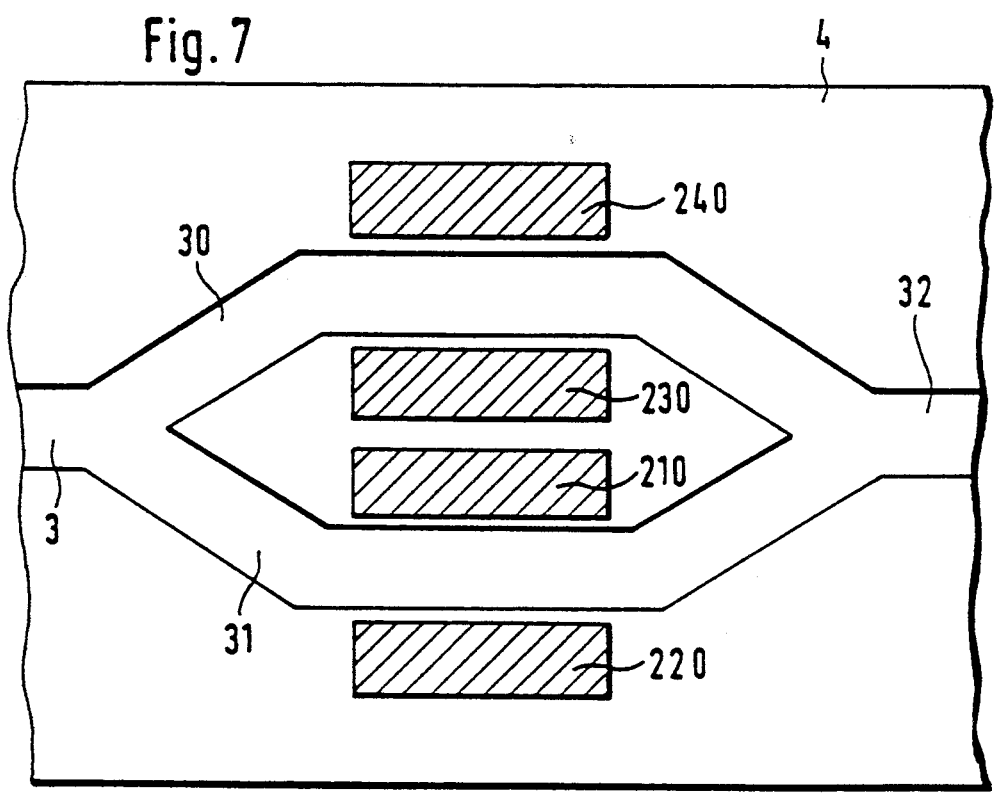

INTEGRATED OPTICAL WAVEGUIDE

BACKGROUND OF THE INVENTION

1. Field of the Invention

The present invention relates to a method of manufacturing an optical waveguide which is integrated on a transparent substrate and has electrodes along sides of the waveguide.

It also relates to the optical waveguide itself and to a use of the optical waveguide.

2. Background Information

EP 0304602 A2 discloses an arrangement in which an optical waveguide is integrated on a substrate. The substrate has electrooptical properties, i.e., it exhibits the Pockels effect, and is preferably formed from lithium niobate. If two optical waveguides on the substrate extend side by side and are separated by a short distance over a predetermined coupling length, an optical switch can be formed from them. To this end, a pair of electrodes for applying a switching voltage is disposed above the surface of the substrate in the area of the coupling region, and separated from said surface by a dielectric intermediate layer. In the coupling region, the distance between the two optical waveguides is chosen so that light is coupled between the optical waveguides as a function of the applied switching voltage. The optical waveguides are formed by diffusing into the substrate a material with a higher refractive index than that of the substrate.

This optical waveguide is disadvantageous in that the necessary diffusion processes are carried out at high temperatures, and that the dimensions of the substrates are limited by the available lithium niobate single crystals. In addition, lithium niobate has the disadvantage that its refractive index differs widely from that of the glass of a glass fiber. This causes losses when light is coupled from a glass-fiber optical waveguide to a lithium-niobate optical waveguide.

SUMMARY OF THE INVENTION

It is the object of the invention to provide a method whereby optical waveguides can be integrated on a substrate for various purposes.

The invention is characterized in that the upper surface of the substrate is covered with a metal layer, parts of the metal layer are etched away to form metallic stripes, the substrate is etched in the area between the stripes to form a groove, subsequently, the metallic stripes are etched to form areas constituting the electrodes, and the groove is filled, at least up to the level of the surface of the areas constituting the electrodes with a material which exhibits an electrooptical effect and forms the optical waveguide.

Another object of the invention is to provide such an optical waveguide and to specify a use of such an optical waveguide.

According to the invention, the optical waveguides can also be formed from polymers, which partly have higher electrooptical coefficients than lithium niobate.

BRIEF DESCRIPTION OF THE DRAWINGS

Embodiments of the invention will now be explained with reference to the accompanying drawings, in which:

FIGS. 1–6 show individual steps of the method of manufacturing an optical waveguide, and FIG. 7 shows an electrooptical modulator.

DETAILED DESCRIPTION OF THE PREFERRED EMBODIMENT(S)

Figure 1:
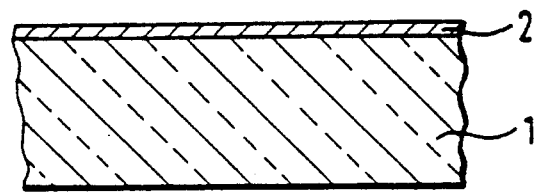
Figure 2:
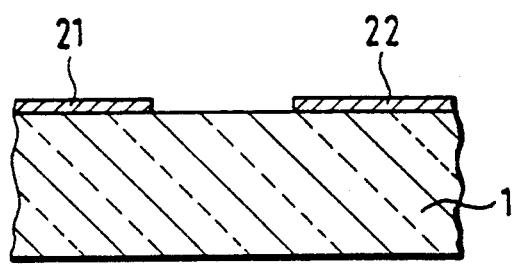
Figure 3:
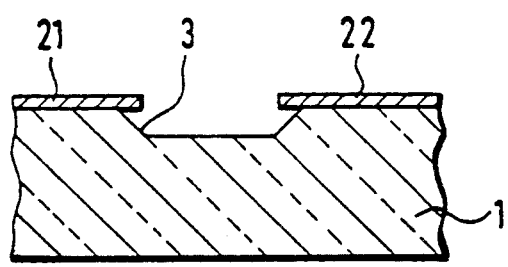
Figure 4:
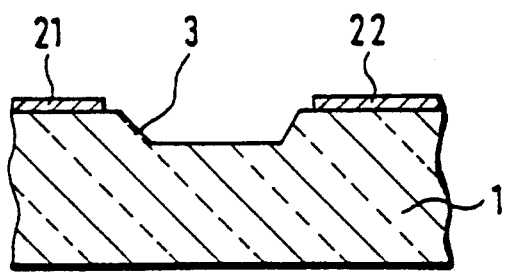

A metal layer 2 for example chromium and gold is deposited on a transparent substrate 1 by vacuum evaporation (FIG. 1). The metal layer 2 is then patterned using photolithographic techniques to form two metallic stripes 21, 22 (FIG. 2). The gap between the two stripes typically has a width of 10 $\mu$m and a length of 10–20 mm. In the area of the gap, a portion of the substrate 1 is removed by an etch solution (FIG. 3), with the stripes 21, 22 acting as a mask. A groove 3 is formed, which has a depth of for example 2 $\mu$m. The groove 3 is wider than the gap between the stripes 21, 22 because the latter are undercut by the etch solution. In a next step (FIG. 4), therefore, the gap is widened by another etching or photolithographic process, so that the stripes 21, 22 no longer project over the groove 3.

The regions 210, 220, which constitute the electrodes, are formed from the stripes 21, 22 by photolithographic techniques (FIG. 5). FIG. 5 is a top view.

Finally, the substrate 1 is covered with a layer 4 having electrooptical properties (FIG. 6).

Especially suited for this layer 4 are polymers. Such a polymer is composed, for example, of polymethyl methacrylate and an azo or stilbene compound dissolved or chemically bonded therein. The polymer has a higher refractive index than the substrate 1, so that light will be guided in the optical waveguide formed by the groove 3.

The polymer is polarized above its softening point by a DC voltage and then cooled in an electric field. This gives it its electrooptical properties. Thus, the refractive index of the optical waveguide can be controlled between the electrodes by applying a voltage.

If an AC voltage is applied to the electrodes, the optical waveguide will form a phase modulator in this area.

It is also possible to integrate other optical components, such as optical switches or directional couplers, on the substrate 1.

To form a Mach-Zehnder interferometer (FIG. 7), the groove 3 is divided into grooves 30, 31, which are recombined into a groove 32. The electrodes associated with the groove 31 are the regions 210, 220, and the electrodes associated with the groove 30 are the regions 230, 240. The regions 210, 230 may also be combined into a single region. By superposition of the phase-modulated light generated in the grooves 30, 31 by applying an AC voltage, amplitude-modulated light is obtained in the groove 32.

What is claimed is:

1. A method of manufacturing an optical waveguide integrated on a transparent substrate and having electrodes along sides of said waveguide, comprising the steps of:

covering the upper surface of the substrate with a metal layer;

etching away parts of the metal layer to form metallic stripes;

etching the substrate in the area between the stripes to form a groove;

etching the metallic stripes to form areas constituting the electrodes; and filling the groove, at least up to the level of the surface of said areas constituting the electrodes, with a material which exhibits an electrooptical effect and forms the optical waveguide.

2. A method as claimed in claim 1, wherein said material is a polymer and the step of filling the groove comprises polarizing said material above its softening point by a DC voltage and subsequently cooling it down.

3. An optical waveguide integrated on a transparent substrate and having electrodes along sides of the waveguide, comprising:
- a substrate transparent having at least one groove at its surface;
- areas of metal on the surface of said substrate which form electrodes extending along both sides of said at least one groove; and
- a layer filling at least the groove which is made of a material exhibiting electrooptical properties and forms an optical waveguide.

4. An optical waveguide as claimed in claim 3, wherein the layer is made of a polymer.

5. An optical waveguide as claimed in claim 3, wherein the polymer is composed of polymethyl methacrylate and one of an azo compound and a stilbene compound chemically bonded thereto.

6. An optical waveguide as claimed in claim 3, forming
- a Mach-Zehnder interferometer wherein said at least one groove comprises a first groove which divides into a second and a third groove at one end of said waveguide, said second and third grooves merging into a fourth groove at an opposite end of said waveguide; and
- wherein said areas of metal are provided along both sides of said second and third grooves to serve as electrodes.

7. The optical waveguide claimed in claim 3 wherein it forms a phase modulator by the application of an AC voltage to said areas constituting the electrodes.

8. An optical waveguide as claimed in claim 3, wherein the polymer is composed of polymethyl methacrylate and one of an azo compound and a stilbene compound dissolved in the polymethyl methacrylate.

* * * * *